Nov. 3, 1942.                J. SPIEVAK                2,301,151
ADJUSTABLE STOP COUNTERSINK
Filed July 14, 1941
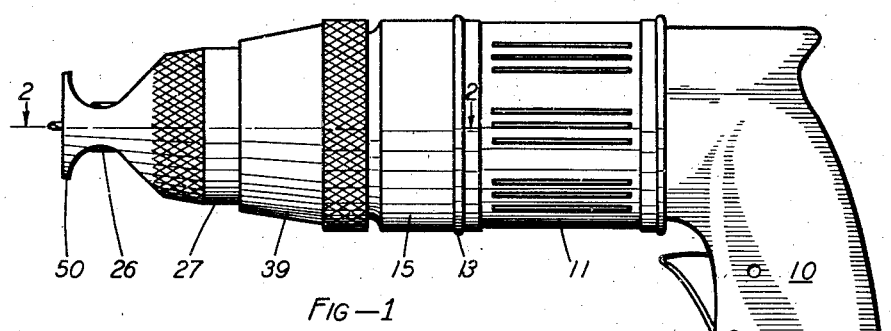
Fig—1
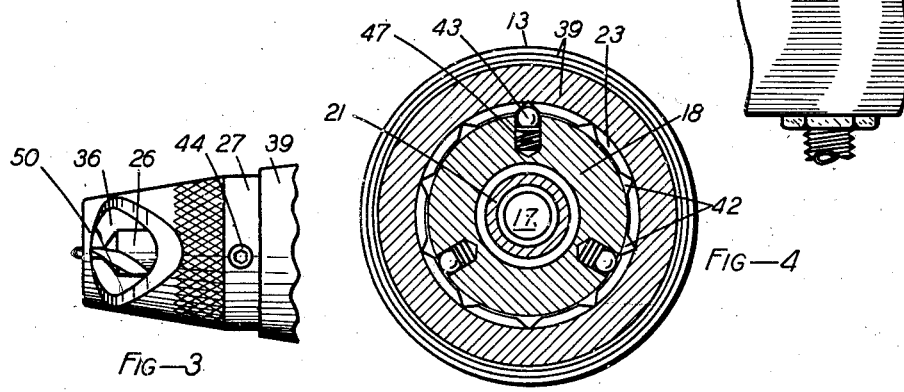
Fig—3  Fig—4
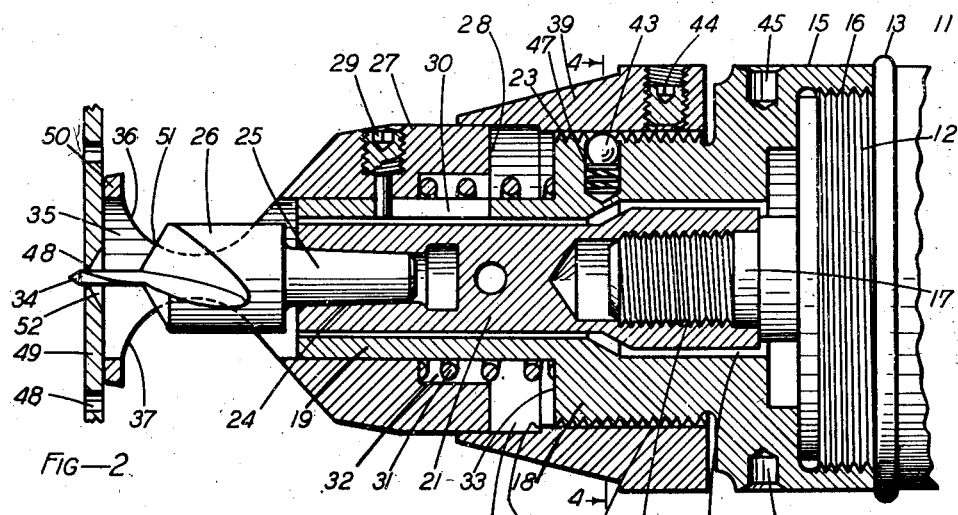
Fig—2
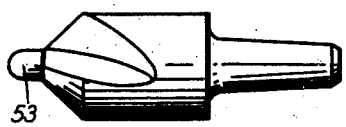
Fig—5
INVENTOR
Joseph Spievak Patented Nov. 3, 1942

2,301,151

UNITED STATES PATENT OFFICE 2,301,151

ADJUSTABLE STOP COUNTERSINK

Joseph Spievak, Hollywood, Calif., assignor to Lockheed Aircraft Corporation, Burbank, Calif.

Application July 14, 1941, Serial No. 402,329

11 Claims. (Cl. 77—73.5)

This invention relates to metal or wood forming tools and more particularly to tools for use in drilling, boring or countersinking in any desired material to a predetermined distance or depth.

This invention finds its most specific application in connection with power driven tools for drilling or countersinking operations in metal.

An object of this invention is to provide a drilling or countersinking tool which may be accurately adjusted with facility to limit automatically and precise the depth of a drilling or countersinking cut to close tolerances. Another object of this invention is to provide a drilling or countersinking tool which while accurately adjustable for depth of cut will at the same time provide an automatic shield for the cutting element whereby the material to be worked and the hands of the operator will be prevented from accidental contact therewith during or intermediate the cutting operations interval. A further particular object of this invention is to provide a micrometer depth adjustment which will be positive in operation and may be accurately varied to form or hold positively, predetermined known cutting dimensions.

The invention accordingly resides broadly in an adjustable non-rotatable depth limiting device adapted to be semi-permanently fixed to the housing or frame of a power driven hand drill or the like machine by means of which the depth of drilling or countersinking operations can be automatically and precisely limited. The invention also resides more specifically in a depth limiting device which is retractable and which is adapted to provide a guard or housing for the drilling or cutting element. The invention further resides in a micrometer type of depth limiting device by means of which cutting or drilling depths can be precisely regulated and positively maintained.

Other objects and features of novelty will be evident hereinafter.

In the drawing which illustrates a preferred embodiment of the invention,

Figure 1 is a side view of the general assembly showing the stop countersink or drilling unit attached to a power driven tool of conventional design;

Figure 2 is an enlarged sectional view of the device of the invention taken on line 2—2 of Figure 1;

Figure 3 is a fragmentary detail of the retractable sleeve portion of the device as it appears in the top view of Figure 1;

Figure 4 is a cross-sectional view taken on line 4—4 of Figures 1 and 2;

Figure 5 is an optional form of cutting tool.

In the figures, 10 is the hand grip and 11 the housing of the prime mover of a power operated hand drill unit which may be electrically or pneumatically operated as here illustrated. The said unit is of conventional design except that it is provided with a threaded connection 12 fixed to the outer end 13 of the unit housing 11 to which the device of this invention is adapted to be semi-permanently coupled.

The body member 15 of the stop countersink unit is cylindrical in general form and is provided at the inner end with suitable threads 16 by means of which it is adapted to make threaded connection to the before mentioned threaded connection 12 of the prime mover housing 11 and by which it is normally non-rotatably fixed and supported in coaxial relation to the prime mover shaft or spindle 17.

The said body member 15 carries or includes as an integral part thereof a threaded intermediate shoulder 18 of reduced outside diameter and an outwardly extending cylindrically shaped sleeve guide 19 of an outside diameter substantially less than either said intermediate shoulder 18 or body member 15, the outside cylindrical surfaces of said body member 15, shoulder 18 and sleeve guide being coaxially arranged.

The body member 15 is provided with a concentric internal bore 20 of variable diameter adapted to accommodate coaxially a rotatable tool adapter mandrel 21 which in turn makes a screwed coupling at 22 with the prime mover shaft 17. The mandrel is provided at the outer end with a taper chuck 24 adapted to receive the tapered shank 25 of a cutter tool or drill such, for example, as a countersink drill 26.

A stop sleeve 27 is adapted to make a sliding fit upon the guide member 19 and is retained thereon with limited freedom for axial movement for reciprocation by means of a screwed stop pin 29 which passes through the stop sleeve and extends laterally with a slip fit into a longitudinally positioned slot 30 in the guide member 19. The said stop sleeve 27 is urged outwardly and normally maintained in an extended position upon the guide member 18 and against the stop pin 29 as shown in Figure 2, by means of a compressed coil spring 31 which is partially retained at one end in a counterbored annular recess 32 provided within the inner end of said stop sleeve 27 and which reacts at the opposite end against the annular shoulder 33 formed at the junction of the sleeve guide member 19 and the intermediate body member 18. The outer portion of the stop sleeve 27 which extends beyond the end of the sleeve guide 19 and which normally substantially houses the cutter 26 is provided with an axial bore 35 through which the said cutter is adapted to be extended and a pair of side openings or louvres 36 and 37 communicating with the stop sleeve bore through which the position of the cutter may be viewed and out of which cuttings and shavings formed by the cutter or drill may pass.

An adjustable stop nut 39 of a shape approximating a truncated cone is carried upon and makes threaded connection at 23 with the threaded intermediate portion 18 of the body 15. The stop nut 39 is counter-bored at 40 in the outer end to accommodate the retraction of the stop sleeve 27 and to form a narrow annular shoulder 41 which serves as a stop to limit the inward or retractive motion of the said stop sleeve. The inner threaded portion of the bore of the stop nut 39 is provided with a plurality of uniformly shaped axially positioned grooves or splines 42 which, acting in conjunction with spring actuated balls 43 retained in radially positioned drilled recesses 47 in the intermediate body portion 18, serves to lock the stop nut in predetermined angular positions upon the common threads.

A set screw 44 serves to semi-permanently lock the stop nut 39 against movement and to thereby retain any resired adjustment thereof.

A pair of drilled holes 45 and 46 are provided in the periphery of the body portion 15 of the device for the application of a special wrench for making or breaking the threaded connection at 12—16 with the prime mover housing.

The operation of the apparatus or device of the invention is as follows: If, for example, it is desired to countersink holes previously drilled in a piece of sheet metal the tool is applied to the drilled sheet metal as illustrated in Figure 2 with the tip 34 of the countersink cutter head 26 inserted in a drilled hole 48 of the sheet 49 and the annular face 50 of the outer end of the stop sleeve 27 is then brought to bear squarely upon the adjacent surface of the sheet. Upon application of sufficient force upon the tool and against the sheet metal surface to overcome the compressive force of the coil spring 31 the said stop sleeve 27 is forced to retract from its outmost position as shown in Figure 2 and into the bore 40 of the stop nut 39 until said stop sleeve has moved inwardly along the guide sleeve 19 to a point where the inner end 28 of the stop sleeve is brought up against the shoulder 41 of the stop nut. This having been done the beveled cutter edges 51 of the countersink head 26 will have penetrated into the sheet face surrounding the drilled hole to form an angular depression or countersunk hole as shown at 52. The depth to which the said countersink is formed into the metal sheet is governed by the setting of the adjustable stop nut 39.

If desired, when employing a countersinking tool such as shown in Figure 2 which combines a pilot drill 34 together with an angular countersink cutter head 26, the drilling and countersinking operations may be performed in a single operation. Ordinarily, however, when only countersink operations are desired to be performed upon previously drilled sheets, a cutter head is employed, as illustrated in Figure 5, which, instead of having a pilot drill as shown at 34 in Figure 2 employs a smooth ended pilot knob 53 which serves only to center and guide the countersink cutters into the drilled holes 48. The knob 53 which is removable, has a diameter only slightly less than the hole in the sheet metal to be countersunk.

This adjustment for depth of cut is performed by rotation of the stop nut 39 upon the threads 23 to move the said stop nut longitudinally forward or backward upon the threads on the intermediate body member 18 and thus to vary the clearance between the inner end 28 of the stop sleeve and the annular shoulder 41 of the stop nut bore 40 into which the stop sleeve can be retracted. By a proper choice of the number and pitch of threads 23 the number of notches 42 in the stop nut 39 and the number of ball locks 43 in the intermediate portion of the tool body, the stop nut may be made to operate as a micrometer adjustment to limit the retraction of the stop sleeve to any desired adjustable and predetermined fraction of an inch. For example, when employing 32 threads per inch and 10 lock notches in the stop nut with three equally angularly spaced ball locks in the intermediate body member 18, one click of the ball lock, or in other words a rotation of the stop nut through an angle equal to one-third of the angular separation of the notches which is one-thirtieth of a complete revolution, will move the stop nut axially approximately .00103 inch. Other lock nut threading and ball lock arrangements are possible which may be employed as desired to give micrometer adjustments of any suitable proportions or fractions of an inch. For example, with 50 threads per inch on the stop nut, ten notches and four equally spaced ball locks, each ball lock click upon rotation of the stop nut will move the stop nut axially exactly .001 inch. The retractive adjustment of the stop sleeve and thus the corresponding depth of a drilled hole or countersink cut can be readily adjusted in positive steps of .001 inch to any desired predetermined depth within the maximum adjustment range of the device.

The apparatus of this invention, while most particularly described hereinbefore as being adapted to countersinking operations may also be employed with equal facility and advantage to straight drilling operations where it is desired to accurately control the depth of the hole drilled. The apparatus can also be employed for burring drilled holes and/or various other cutting and grinding operations. Therefore, when in the specifications and claims the term countersinking is employed, it is to be understood that the term is not limited but may include within its meaning, drilling, burring, grinding and other similar cutting operations requiring precise depth regulation.

The invention is applicable to the beforementioned operations in metal, wood and various plastics, resins and the like workable compositions and materials.

The countersink stop mechanism of this invention is preferably made of steel which may be suitably heat-treated and/or hardened, but other materials, such as aluminum, aluminum alloy, brass and various other alloys and compositions may, under some circumstances, be employed.

Adventages of this countersink unit reside in its compactness, the accuracy and facility with which depths of cuts can be regulated and maintained, safety to both the operator and the part to be worked, and the adaptability of the whole unit together with the prime mover to operation with one hand. A particular advantage of the apparatus resides in the micrometer type of means for regulating the depth of cut.

The foregoing is merely illustrative of the apparatus of the invention and is not intended to be limiting. The invention includes any apparatus or device which accomplishes the same results within the scope of the claims.

I claim:

1. A stop countersink unit comprising in combination a body member adapted to be fixedly coupled at the inner end with a prime mover housing, a retractable sleeve reciprocatably attached to and extending beyond the outer end of said body member and adapted to substantially house a rotatable cutting tool therein when said sleeve is in an extended position and means to limit adjustably the retractability of said sleeve with respect to said body member whereby a predetermined limited length of cutting tool may be exposed.

2. A stop countersink unit comprising in combination a body member adapted to be fixedly coupled at the inner end with a prime mover housing, a retractable sleeve reciprocatably attached to and extending beyond the outer end of said body member and adapted to substantially house a rotatable cutting tool therein when said sleeve is in an extended position, a spring adapted to urge and normally maintain said sleeve in a fully extended position with respect to said body member, and means to limit adjustably the retractability of said sleeve with respect to said body member upon application of retractive force to the outer end of said sleeve and against said spring whereby a predetermined limited length of cutting tool may be exposed.

3. A stop countersink unit comprising in combination a body member adapted to be fixedly coupled at the inner end with a prime mover housing, said body member having an axially positioned bore adapted to house a coaxially positioned rotatable tool mandrel extending from said prime mover, a retractable sleeve reciprocatably attached to and extending beyond the outer end of said body member and adapted to substantially house therein a rotatable cutting tool carried in said mandrel when said sleeve is in an extended position, and means to limit adjustably the retractability of said sleeve with respect to said body member whereby a predetermined limited length of the cutting tool may be exposed.

4. A stop countersink unit comprising in combination a body member adapted to be fixedly coupled at the inner end with a prime mover housing, a retractable sleeve reciprocatably attached to and extending beyond the outer end of said body member and adapted to substantially house a rotatable cutting tool therein when said sleeve is in an extended position, an intermediate threaded shoulder portion of said body member, a stop nut making threaded connections with said shoulder and adapted to adjustably limit the retractability of said sleeve with respect to said body member, a spring actuated ball lock associated with said intermediate body portion and adapted to lock said stop nut against rotation in predetermined angular positions to limit adjustably the retractability of said sleeve with respect to said body member whereby a predetermined limited length of cutting tool may be exposed.

5. A stop countersink unit comprising in combination a body member adapted to be fixedly coupled at the inner end with a prime mover housing, said body member having an axially positioned bore adapted to house a coaxially positioned rotatable tool mandrel extended from said prime mover, a retractable sleeve reciprocatably attached to and extending beyond the outer end of said body member and adapted to substantially house therein a rotatable cutting tool carried in the outer end of said mandrel when said sleeve is in an extended position, a spring adapted to urge and normally maintain said sleeve in a fully extended position with respect to said body member, an intermediate threaded shoulder portion of said body member, a stop nut making threaded connection with said shoulder, a spring actuated ball lock associated with said intermediate body portion and adapted to lock said stop nut against rotation in predetermined angular positions to limit adjustably the retractability of said sleeve with respect to said body member upon application of a retractive force to the outer end of said sleeve whereby a predetermined limited length of cutting tool may be exposed.

6. Apparatus according to claim 5 with means to maintain the said body member, retractable sleeve and stop nut normally non-rotatable with respect to said prime mover housing during operation of the tool.

7. A stop countersink unit comprising in combination a prime mover having a stationary housing, a retractable tubular sleeve non-rotatably but reciprocatably attached to said prime mover housing and adapted to substantially house a rotatable cutting tool therein when said sleeve is in an extended position and means to limit adjustably the retractability of said sleeve with respect to said housing whereby a predetermined limited length of cutting tool may be exposed.

8. A stop countersink unit comprising in combination a prime mover having a stationary housing and a rotatable shaft, a body member adapted to be fixedly coupled at the inner end with the prime mover housing, said body member having an axially positioned bore adapted to house a coaxially positioned rotatable tool mandrel attached to and extending from said prime mover shaft, a retractable sleeve reciprocatably attached to and extending beyond the outer end of said body member and adapted to substantially house therein a rotatable cutting tool carried in the outer end of said mandrel when said sleeve is in an extended position and means to limit adjustably the retractability of said sleeve with respect to said body member whereby a predetermined limited length of cutting tool may be exposed.

9. Apparatus according to claim 7 in which the means to limit adjustably the retractability of the said sleeve comprises an adjustable micrometer stop screw device.

10. A stop countersink unit comprising in combination a prime mover having a stationary housing and a rotatable shaft, a body member adapted to be fixedly coupled at the inner end with the prime mover housing, said body member having an axially positioned bore adapted to house a coaxially positioned rotatable tool mandrel attached to and extending from said prime mover shaft, a retractable sleeve reciprocatably attached to and extending beyond the outer end of said body member and adapted to substantially house therein a rotatable cutting tool carried in the outer end of said mandrel when said sleeve is in an extended position, a spring adapted to urge and normally maintain said sleeve in a fully extended position with respect to said body member, an intermediate threaded shoulder portion of said body member, a stop nut making threaded connection with said shoulder, and a spring actuated ball lock associated with said intermediate body portion and adapted to lock said stop nut against rotation in predetermined angular positions to limit adjustably the retractability of said sleeve with respect to said body member upon application of a retractive force to the outer end of said sleeve whereby a predetermined limited length of cutting tool may be exposed.

11. Apparatus according to claim 7, with means to limit adjustably, in predetermined dimensional steps, the retractability of said sleeve with respect to said body member.

JOSEPH SPIEVAK.